May 8, 1928.  
P. MIKS  
TOOL JOINT  
Filed May 7, 1921

1,668,921

Inventor
Pierre Miks
By
Hardway Cather
Attorneys

Patented May 8, 1928.

1,668,921

UNITED STATES PATENT OFFICE.

PIERRE MIKS, OF HOUSTON, TEXAS.

TOOL JOINT.

Application filed May 7, 1921. Serial No. 467,599.

This invention relates to new and useful improvements in a tool joint.

One object of the invention is to provide a device of the character described specially designed for connecting together the joints of a drill stem, used in rotary drilling, so that the stem may be quickly made up in letting the same down into the bore and quickly broken up while withdrawing the stem.

Another object is to provide a tool joint whose members may be locked together so that they will not unscrew and separate while rotating backward and so that the torsional strain sustained by the pipe will not cause them to become too tightly screwed together.

With the above and other objects in view this invention has particular relation to certain novel features of construction, operation and arrangement of parts, an example of which is given in this specification and illustrated in the accompanying drawings, wherein:—

Figure 2:
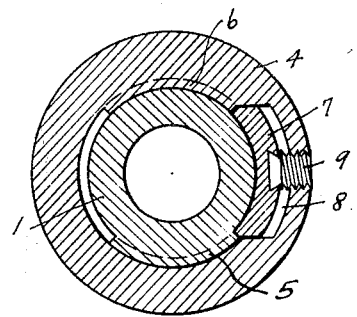
Figure 2 is a transverse sectional view taken on the line 2—2 of Figure 1.
Figure 1:
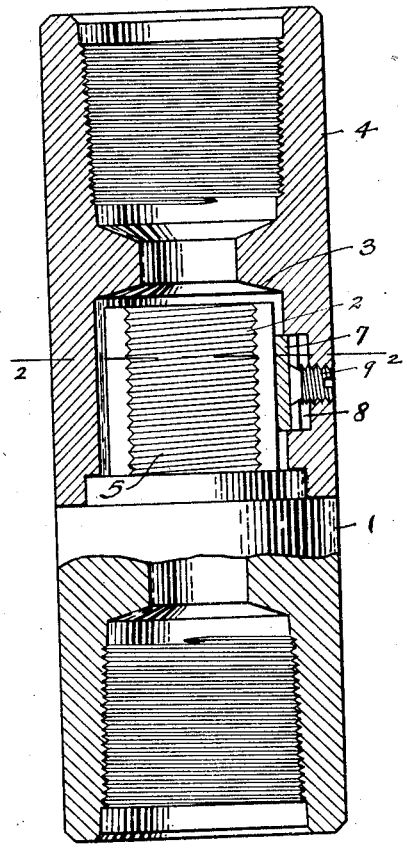
Figure 1 is a side elevation of the device partially in section.

Referring now more particularly to the drawings, the numeral 1 designates one of the tool joint members, one end of which has a reduced pin 2 which is adapted to fit into a corresponding box 3 of the abutting end of the other member 4. The pin and box have the mutilated threads 5 and 6 respectively, which engage when the pin is inserted into the box and given a quarter turn. The joint members may be thus quickly united or separated. The member 4 has a block 7 seated in a recess 8 in the inner wall thereof. This block is arcuate so as to conform to the contour of the wall of the box 3 and when seated in its recess is flush with said wall. A set screw 9 is threaded through the member 4 and its inner end has a swiveling connection with the block 7. When the members have been screwed together the set screw 9 may be manipulated to force the block 7 inwardly to seat it between the sections of the threads 5 and this will lock said members against relative turning. When the set screw is turned in the other direction the block 7 is withdrawn into its recess and the members 1 and 4 may then be unscrewed and separated.

What I claim is:—

1. In combination a tool joint having two members, one of which has a pin and the other of which has a box to receive the pin said pin and box having grooves forming similar mutilated threads, a movable block seated in the inner wall of the box and adapted to lock in one of said grooves in the threaded section of the pin when the members are screwed together and the mutilated portions are in alignment and a set screw threaded through the wall of the box by means of which said block may be forced into and out of locking position, said set screw being flush with the outer wall of said box when said block is seated.

2. The combination with a tool joint having two members, one of which is reduced forming a pin and the other of which has a box adapted to receive the pin, said pin and box having similar mutilated threads, a movable block seated at all times in the inner wall of the box and adapted to be moved inwardly between the threaded sections of the pin when the members are screwed together, and the mutilated portions are in alinement and a member threaded through the wall of the box by means of which said block may be forced into locking position, said member being flush with the outer wall of the box when the block is seated, said member having a swiveling connection with the block whereby the block may be withdrawn into the inner wall of the box when in released position.

In testimony whereof I have signed my name to this specification.

PIERRE MIKS.